United States Patent [19]

Cubeta

[11] 4,161,069
[45] Jul. 17, 1979

[54] ELONGATED FLEXIBLE LEVEL FOR USE AS TRANSIT

[76] Inventor: Angelo Cubeta, Maple Ave., Higganum, Conn. 06441

[21] Appl. No.: 853,025

[22] Filed: Nov. 21, 1977

[51] Int. Cl.$^2$ ............................ G01C 5/04; G01C 9/22
[52] U.S. Cl. ........................................ 33/367; 137/43
[58] Field of Search ...................... 33/367, 377; 137/43

[56] References Cited

U.S. PATENT DOCUMENTS

| 397,294 | 2/1889 | Karr | 33/367 |
|---|---|---|---|
| 909,529 | 1/1909 | Blair | 33/367 |
| 2,769,452 | 11/1956 | Gill | 137/43 |
| 2,971,264 | 2/1961 | Cowan | 33/367 X |
| 3,842,513 | 10/1974 | Clark | 33/367 |

FOREIGN PATENT DOCUMENTS 811038  8/1951  Fed. Rep. of Germany ............. 33/367

*Primary Examiner*—Charles E. Phillips

[57] ABSTRACT

An elongated flexible level assembly usable as a transit or the like includes a pair of float assemblies each having a flow passage thereinto adjacent the lower end, a pair of valve seats within the chamber of the housing in spaced relationship above the flow passage thereinto and valve members reciprocable in the chamber to seal the flow passage through the valve seats. Indicator means is provided on the housing intermediate the two valve seats, and the housing is transparent at least about the indicator means so as to permit viewing of the water level therein. A flexible conduit interconnects the flow passages of the two float assemblies and liquid is introduced into the assembly in a volume sufficient to fill the conduit and the two float asemblies to the level of the indicator means.

Loss of the liquid from the assembly is avoided by providing float means below the upper valve member to move this valve member into sealing engagement with its valve seat in the event that the water level rises to a point approaching the upper valve seat. In addition, valve actuating means within the housing is responsive to substantial tilting of a float assembly to move the valve members into sealing engagement with the valve seats.

14 Claims, 12 Drawing Figures

ELONGATED FLEXIBLE LEVEL FOR USE AS TRANSIT

BACKGROUND OF THE INVENTION

Occasionally it is desirable to determine the vertical height of a point spaced a substantial distance from an initial point so as to establish a level condition therebetween. Transits and like instruments employing optical systems to achieve this result are generally expensive and relatively complicated so as to preclude their general use by home handymen, etc. It has heretofore been proposed to utilize devices wherein two members provided with some form of indicating means were coupled by pipes, hoses or the like and moved relative to each other until the liquid level in each of the two members was identical, thereby establishing a level condition therebetween. Exemplary of such devices are the following patents:

| Patentee | U.S. Pat. No. | Granted |
| --- | --- | --- |
| A. Gamble | 451,680 | May 5, 1891 |
| J. Darragh | 532,949 | January 22, 1895 |
| I. Husey | 1,231,162 | June 26, 1917 |
| J. Richardson | 1,576,470 | March 9, 1926 |
| J.B. Boyd | 2,150,048 | March 7, 1939 |
| F.C. Waldo | 2,566,102 | August 28, 1951 |
| O.T. Houge | 2,789,365 | April 23, 1957 |
| G. Blatchford | 2,814,127 | November 26, 1957 |
| J.M. Chapman | 3,015,167 | January 2, 1962 |
| H.O. Haissig et al | 3,132,428 | May 12, 1964 |

Generally, such devices have failed to provide means to avoid loss of the liquid within the assembly in the event that one of the two members is disposed substantially below the other causing the water level to rise above its vertical height and when one of the members is inadvertently skewed substantially from the vertical. Several of the devices have proposed various valve arrangements to alleviate one or both of these possible conditions for losing the liquid within the system, but generally the valve arrangements proposed have been either ineffective or relatively expensive.

It is an object of the present invention to provide a novel elongated flexible level assembly for use as a transit or the like which is relatively simple and economical to fabricate and which includes means for minimizing the likelihood of inadvertent loss of liquid from the assembly.

It is also an object to provide such a level assembly which is simple and rugged in construction and which may be readily disassembled for storage.

Another object is to provide such a level assembly wherein liquid may be readily introduced at the time of use or removed after use has been completed.

SUMMARY OF THE INVENTION

It has now been found that the foregoing and related objects can be readily attained in an elongated flexible level assembly for use as a transit and the like which includes a pair of float assemblies each comprising a housing providing a chamber with a flow passage adjacent its lower end, a first valve seat in the chamber adjacent to the flow passage and between the flow passage and the upper end of the chamber. The valve seat defines a first valve opening and cooperates with a first valve member reciprocable in the chamber relative thereto to effect sealing of the first valve opening upon seating thereon. A second valve seat is provided in the chamber spaced from the first valve seat towards the upper end of the chamber and defines a second valve opening, and a second valve member is reciprocable in the chamber relative thereto to effect sealing of the second valve opening upon seating thereabout.

Indicator means is provided on the housing intermediate the first and second valve seats, and the housing is transparent at least about the indicator means. Float means is movable in the chamber in response to fluid level above the indicator means to move the second valve member into seating engagement with the second valve seat and thereby prevent passage of liquid and air therethrough. Valve member actuating means is operatively engaged with each of the valve members and operable to move the valve members into engagement with the valve seats upon substantial deviation of the housing from the vertical and the actuating means permits flow of air and liquid thereby.

An elongated flexible conduit is connected at its ends to the float assembliew to provide flow therethrough of liquid into the flow passages of the float assemblies, whereby, when both of the float assemblies are at the same height, the liquid level in the housings will register with the indicator means thereof and, when they are at different heights, the liquid level may rise in the chamber thereof until the float means seals the second valve seat opening to prevent flow of air and liquid therethrough.

In the preferred assembly, the housings include a transparent cylinder providing the chamber with the bottom end thereof being open to provide the flow passage thereinto, and the indicator means conveniently comprises a ring element affixed to the exterior of the cylinder. Removable closure means is provided at the upper end of the cylinder and is substantially fluid and air tight when in place and removable during operation of the level assembly to permit flow of air through the upper end of the cylinder.

Desirably at least one of the housings includes a second flow passage spaced above the first mentioned flow passage to permit introduction of fluid into the assembly, and removable closure means is provided for this second flow passage. The housing includes a cylindrical member providing the chamber and the valve seats are provided by generally annular members secured to the inner surface of the cylinder. Such annular members preferably include an annular lip depending from the lower surface thereof about the valve openings therein and providing the sealing surface of the valve seats. The valve members are cooperatively configured to providing an upstanding lip cooperating with the depending annular lip of the annular valve seat members. In one form, the valve members include a resiliently compressible upper surface portion cooperating with the depending annular lip of the valve seats to effect sealing engagement therewith.

The float assembly may include float support means on the housing in the chamber below the second valve member to support the float thereon below the second valve member in its inoperative position. This float support means is configured and dimensioned to permit passage of air and fluid by the support means and the float means when the float means is supported thereon.

In its preferred form, the valve member actuating means comprises a member having its center of gravity spaced upwardly of its midpoint to provide instability so that tilting of the float assembly will cause the actuating means to tip over to move the valve members upwardly into sealing engagement about the valve openings of the valve seats. Conveniently, the actuating means is of generally conical configuration with weighting means disposed adjacent the apex thereof and apertures provided about the base thereof to permit flow of air and liquid thereby. The actuating means is coupled to the valve members by a generally axially extending connector, whereby tipping over of said actuating means causes said connector to draw the valve members upwardly against the valve seats. Although preferably a separate valve member actuating means cooperates with each of the valve members and is disposed above each of the valve seats, a single valve member actuating means may be provided above the upper valve seat and operatively connected to each of the valve members so as to effect concurrent movement of both valve members into sealing engagement with their valve seats.

In the method for determining the level condition of two horizontally spaced points, the aforementioned level assembly is provided and liquid is introduced into the level assembly in a volume sufficient to entirely fill the flexible conduit and to fill each of the float assemblies to the level of the indicator means. One of the float assemblies is located with its indicator means at a datum height, and the flexible conduit is extended to a horizontally spaced position. Air pressure is allowed to act upon the liquid in each of the float assemblies, and the remotely moved float assembly is moved vertically upwards and downwards until the water level therein is aligned with the indicator means thereof. The level condition is determined thereby and the height of the indicator means is recorded at this point of alignment.

In operation, the liquid and the float of the other float assembly may move upwardly and in turn move the upper of the valve members upwardly into sealing engagement with the corresponding valve seat when one float assembly is disposed below the level of the other. Moreover, one float assembly may be tilted from the vertical and thereby cause the valve member actuating means to move the valve members into sealing engagement with their respective valve seats and thereby prevent flow of liquid thereby.

DETAILED DESCRIPTION OF THE ILLUSTRATED EMBODIMENT

Figure 1:
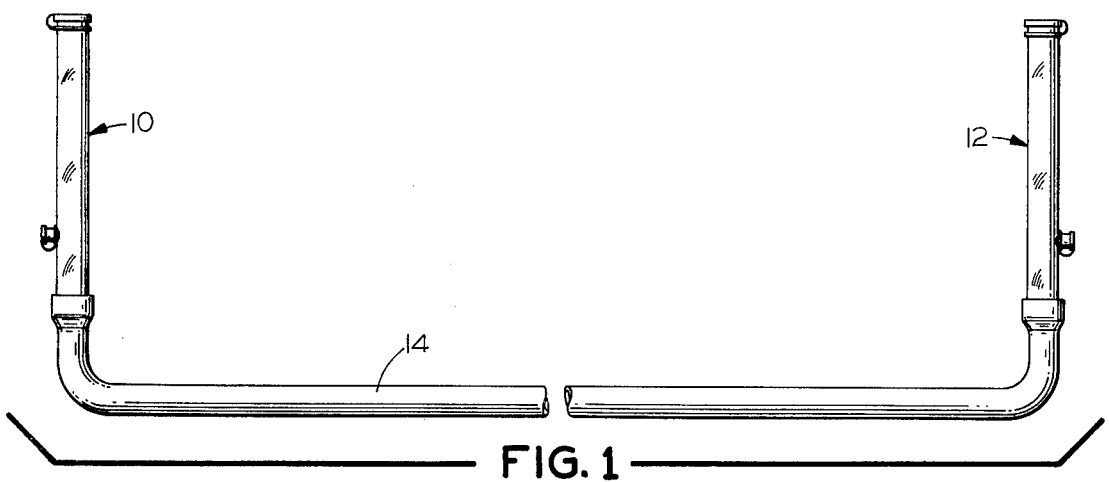
FIG. 1 is a fragmentary side elevational view of a elongated flexible level assembly embodying the present invention with the float assemblies thereof at substantially the same vertical height.

Turning now in detail to FIG. 1 of the attached drawings, there is illustrated an elongated flexible level assembly embodying the present invention which is comprised of the two similarly constructed float assemblies generally designated by the numerals 10,12 and interconnected by the flexible conduit 14. As will be described hereinafter, the float assemblies 10,12 are so connected that vertical misalignment thereof will result in an increase in the fluid level of the lower float assembly.

Figure 2:
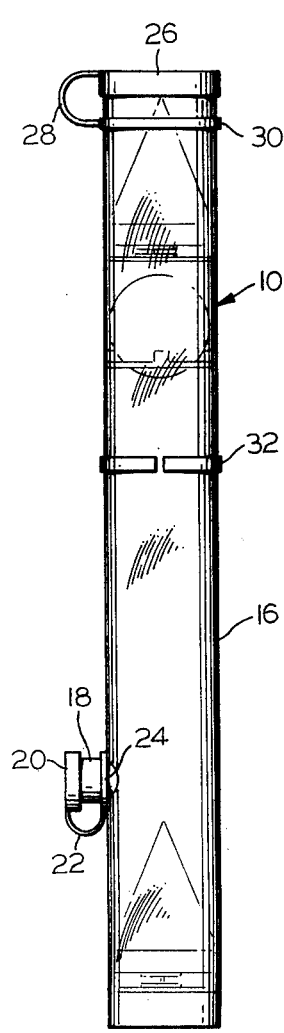
FIG. 2 is a side elevational view of a single float assembly drawn to an enlarged scale.
Figure 3:
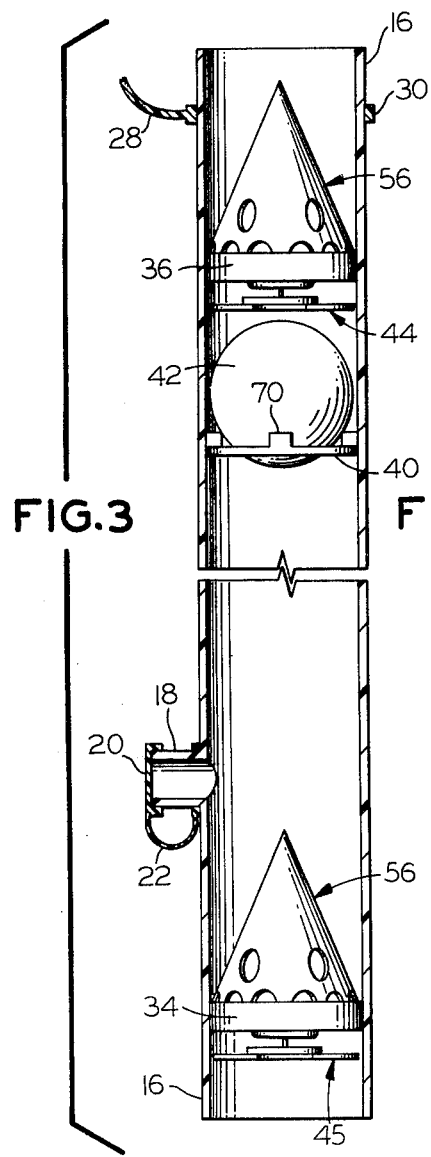
FIG. 3 is a fragmentary side elevational view to a still further enlarged scale of the float assembly of FIG. 2 with portions of the components broken away to reveal internal construction and with the upper cap assembly only partially shown.
Figure 4:
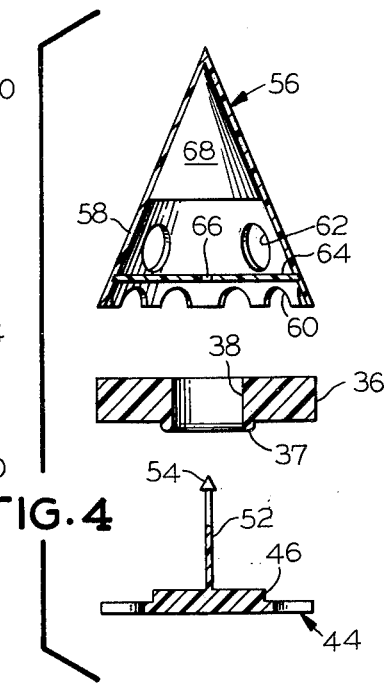
FIG. 4 is a partially exploded sectional view of the upper valve subassembly of FIG. 3.
Figure 5:
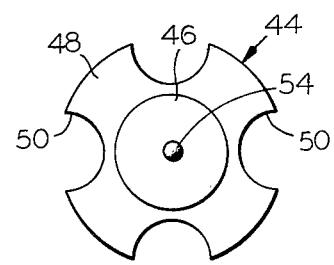
FIG. 5 is a plan view of the valve disc member of the valve assembly of FIG. 4.
Figure 6:
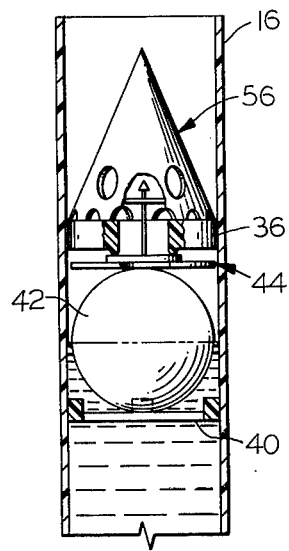
FIG. 6 is a fragmentary elevational view in partial section of the upper portion of a float assembly showing the float moved upwardly by liquid within the housing to force the valve disc member into sealing engagement against the upper valve seat.

As seen in FIGS. 2 and 3, each float assembly 10,12 includes a housing cylinder 16 of transparent material, such as transparent synthetic resin, and having an inlet fitting 18 spaced upwardly from the bottom end thereof. The fitting 18 is provided with a removable cap 20 maintained in assembly on the cylinder 16 by the flexible connector 22 which is attached to the collar 24 disposed over the inlet fitting 18. As is evident from FIG. 1, the flexible conduit 14 is forced over the bottom end of the housing cylinder 16 so as to effect fluid tight sealing thereabout. The upper end of the housing cylinder 16 is provided with a removable closure comprised of the snap fitting cap 26, flexible connector 28 and collar 30 mounted upon the exterior of the housing cylinder 16.

Each of the float assemblies 10,12 has an indicator ring 32 secured thereon at the same axial distance from the bottom end thereof so that the water or other liquid level within the chamber may be viewed relative thereto.

At the lower end of the chamber defined by the cylinder 16 is the lower valve seating ring 34 which is of generally annular configuration and which has an annular lip 37 depending therefrom about the flow passage 38 extending therethrough. The upper valve seating ring 36 is of similar configuration, and both are conveniently separate elements adhesively secured to the inner surface of the cylinder 16.

Spaced below the upper valve seating ring 36 is the generally ring shaped float seat 40 which has four upstanding bosses 70 spaced equiangularly thereabout to support the generally spherical float 42 thereon so that air and liquid may pass thereabout. The ring 36 is also most conveniently a separate element adhesively secured to the cylinder 16.

The valve disc members generally designated by the numerals 44,45 are of substantially similar configuration and include a generally cylindrical body portion 46, a circumferential guide portion of flange 48 at the lower end of the body portion 46 and having flow openings 50 extending therethrough, and a mounting stem 52 extending upwardly from the body portion 46 and having an enlarged head 54 thereon.

The valve actuators are generally designated by tne numeral 56 and include a conical housing 58 having semicircular apertures 60 about the bottom end thereof and circular apertures 62 spaced upwardly therefrom to permit flow of air and liquid thereby and also to reduce the weight of the lower end portion thereof. A crosspiece member 66 of disclike configuration is provided with a coaxial aperture 66 and snap fitted into the interior of the conical housing 58 between the apertures 60, 62. A weight 68 of lead or the like is secured in position within the upper portion of the conical housing 58 so as to provide a center of gravity for the valve actuators 56 disposed above the midpoint thereof. To couple the valve actuators 56 and valve discs 44,45 for movement of the valve discs 44,45 against the valve seating rings 34,36 when there is movement of the valve actuator 56, the mounting stem 52 of the valve discs 44,45 extends upwardly through the flow passages 38 in the seating rings 34,36 and seats in the aperture 66 of the cooperating valve actuator 56.

In the operation of this embodiment, the flexible conduit 14 is initially attached by forcing its ends over the bottom ends of the cylinders 16 of the float assemblies 10,12. Water is introduced into one of the inlet fittings 18 in volume sufficient to fill the conduit 14 and the cylinders 16 until the water level in both float assemblies will be aligned with the indicator rings 32. This is conveniently done by raising one of float assemblies 10,12 into which water is being introduced above the level of the other float assembly a distance substantially equal to the difference in height between the base of the inlet fitting 18 and the indicator ring 32. Although the water may be introduced through the top of the cylinders 16, its cascading about the operating elements is generally undesirable and frequently will result in splashing.

Once the desired water level has been obtained, the two float assemblies 10,12 are moved to the desired positions horizontally spaced with the caps 26 thereon. The indicator ring 32 on one of the float assemblies 10,12 is aligned with a reference or datum vertical mark at one position and the other float assembly is moved vertically upwardly or downwardly at the remote position until the water level theren is aligned with the indicator ring 32. This height is then recorded, conveniently by a reference mark upon a vertical surface corresponding to that height of that indicator ring 32 which will establish a level condition between the reference point and the newly determined point.

As will be appreciated, the caps 26 are removed from the cylinders 16 during operation of the apparatus so as to allow air to flow inwardly and outwardly of the cylinders 16 and allow full gravitation action upon the water within the assembly.

If one of the float assemblies 10,12 is excessively low during operation, the float 42 will rise with the increasing water level within that cylinder 16 until it bears upon the bottom of the upper valve disc 44 and moves it upwardly into sealing engagement with the annular lip 37 of the valve seat ring 36. This will effectively block loss of water from the upper end of the cylinder 16 which, as previously indicated, is uncovered during use.

Figure 7:
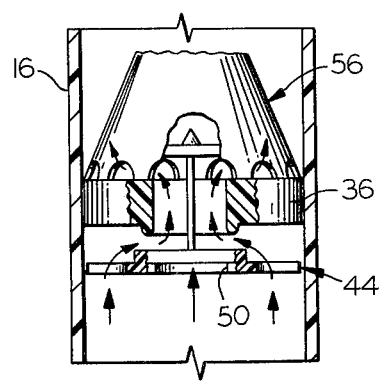
FIG. 7 is a similar view to an enlarged scale of a portion of the upper valve subassembly with the valve disc member in the inoperative position so as to permit passage of air upwardly through the valve seat as shown by the arrows.
Figure 9:
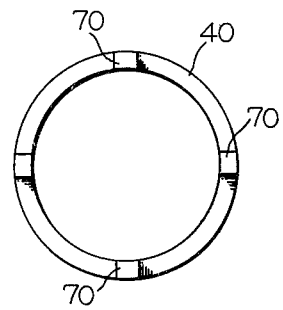
FIG. 9 is a plan view of the float support ring of FIG. 3.
Figure 8:
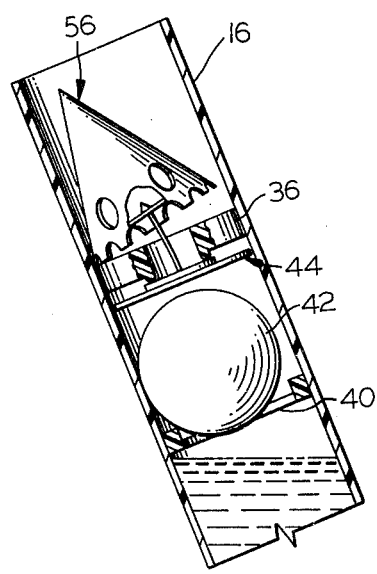
FIG. 8 is a view similar to FIG. 6 wherein the float assembly is tilted so as to cause the valve actuating member to tilt and draw the valve disc into sealing engagement with the valve seat.

In the event that the cylinders 16 of the float assemblies 10,12 should inadvertently be skewed excessively from the desired vertical orientation while the covers 26 are removed, loss of water in the assembly is avoided by action of the valve actuators 56. Such misorientation will cause the valve actuators 56 to tip over within the cylinders 16 because of the location of the center of gravity above their center line, to provide the condition shown in FIG. 8. This tipping action will quickly draw the valve discs 44,45 upwardly against the corresponding seat rings 34,36 by reason of the connection provided by the mounting stems 52. When the misorientation is corrected, the valve actuators 56 will return to the position shown in FIG. 7 and the valve discs 44,45 will descend to their inoperative position.

Figure 10:
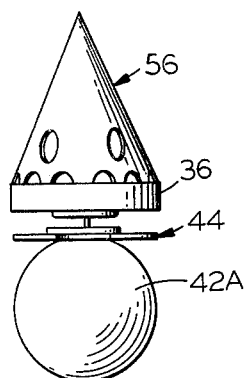
FIG. 10 is an elevational view of an alternative embodiment of float and valve disc member subassembly.
Figure 10:
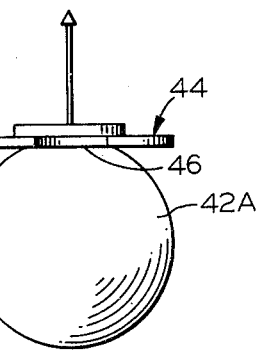

In FIG. 10, there is illustrated an alternative embodiment for the upper valve disc and float. Here the float 42A is adhesively or otherwise secured directly to the lower surface of the cylindrical body 46 of the upper valve disc 44 so that they move in unison both upwardly and downwardly.

Figure 11:
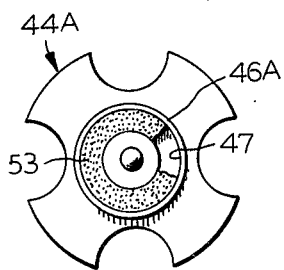
FIG. 11 is a plan view of an alternative embodiment of valve disc member.

In FIG. 11, there is illustrated an alternative embodiment for the valve disc 44B. Here the cylindrical body portion 46A is provided with an annular recess 47 in the upper surface thereof in which is disposed a resiliently deformable material 53. When this embodiment of valve disc 44 is moved upwardly against the annular lip 37 of the valve seat ring 36, the resiliently deformable material 53 will deform about the lip 37 so as to increase the area of sealing contact.

Figure 12:
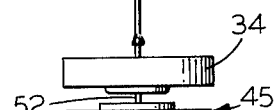
FIG. 12 is an elevational view in partial section similar to FIG. 3 showing an alternative structure wherein a single valve actuating member is coupled to both of the valve disc members.

Turning now to the embodiment of float assembly 10 illustrated in FIG. 12, only one valve actuator 56 is provided and disposed above the upper valve seat ring 36. This actuator 56 is directly secured to the upper valve disc 44A which is conveniently a unitary subassembly of the valve disc and float 42A as shown in FIG. 10. A connector 80 is adhesively or otherwise secured to the lower surface of the float 42A and extends downwardly therefrom to a point somewhat above the lower valve seat ring 34. At its lower end, the connector 80 is provided with a coaxial aperture (not shown) into which is snap fitted the head 54 of the mounting stem 52 of the lower valve disc 45. In this fashion, tipping of the valve actuator 56 will move both the upper and lower valve discs 44,45 into sealing engagement with the corresponding valve seat rings 36,34.

The float assembly is most conveniently fabricated by using for the housing cylindrical tubing of synthetic resin affording desirable impact resistance and transparency such as, for example, polycarbonate resins. Although other transparent resins such as polyacrylates and other materials such as gloss or metal tubing with windows may also be employed. The cap of subassemblies are conveniently molded from resins providing desirable resilience such as polyvinyl chloride, ABS and elastomeric materials such as polybutadiene, polyisoprene and polysilicone. The valve seat members, valve disc members, float seat and valve actuator housings are conveniently injection or compression molded from synthetic materials such as polyamides, acrylics, polycarbonates and ABS.

In assembling the unit, the valve seat rings and float seat may be adhesively engaged in position within the body of the cylinder although they may also be secured in position by mechanical fasteners extending through the body of the cylinder into relatively thick portions of these members. As will be appreciated, the float seat should be secured in position and the float disposed thereon. The upper valve disc may then be loosely assembled with the upper valve seat ring and the valve actuator, and this subassembly then introduced into the cylinder and moved into position at which point the valve seat ring may be secured in position by actuating an adhesive coating about its circumference, by ultrasonic welding or by other suitable means. Similarly, the subassembly of the lower valve actuator seat ring and valve disc may be assembled and introduced into the cylinder and then secured in position.

The material of the conduit should be one providing a desirable degree of flexibility to facilitate coiling in storage. Both rubber polymers and polyvinyl garden hoses have proven satisfactory. The length of the conduit will be dependent in part upon the intended spacing between the two reference points since the present assembly lends itself to use between widely spaced points.

As will be readily appreciated from the foregoing detailed description and the attached drawings, the flexible level assembly of the present invention is one which may be simply and economically fabricated and which is rugged and durable. The level assembly may be partially disassembled for storage and the liquid utilized therein is conveniently water, which may be disposed of at the time of storage. Inadvertent loss of the water or other liquid used therein is effectively precluded by the valves provided within the float assemblies and the actuation of those valves if in fact there is substantial vertical skewing thereof. Using this level assembly, the vertical height of a reference point may be readily translated to a remote point to establish a level condition therebetween.

Having thus described the invention, I claim:

1. An elongated flexible level assembly for use as a transit and the like comprising:
   A. a pair of float assemblies each comprising:
   (1) a housing providing a chamber therewithin with a flow passage thereinto adjacent its lower end;
   (2) a first valve seat in said chamber adjacent to said flow passage and between said flow passage and the upper end of said chamber defining a first valve opening;
   (3) a first valve member reciprocable in said chamber relative to said first valve seat to effect sealing of said first valve opening upon seating on said first valve seat;
   (4) a second valve seat in said chamber spaced from said first valve seat towards said upper end of said chamber and defining a second valve opening;
   (5) a second valve member reciprocable in said chamber relative to said second valve seat to effect sealing of said second valve opening upon seating upon said second valve seat;
   (6) indicator means on said housing intermediate said first and second valve seats, said housing being transparent at least about said indicator means;
   (7) float means movable in said chamber in response to fluid level above said indicator means to move said second valve member into seating engagement with said second valve seat and thereby prevent passage of liquid and air therethrough;
   (8) valve member actuating means above at least said second valve seat, said actuating means comprising a member having its center of gravity spaced upwardly of its midpoint to provide instability whereby tilting of said float assembly will cause said actuating means to tip over; and
   (9) means coupling said actuating means with each of said valve members and operable to move said valve members into engagement with said valve seats upon substantial deviation of said housing from the vertical, said valve members actuating means permitting flow of air and liquid thereby, said actuating means moving said valve members to seal said valve openings upon substantial tilting of a float assembly from the vertical, said coupling means being movable relative to said actuating means upon movement of said second valve member by said float means to permit movement of said second valve member independently of said actuating means; and
   B. an elongated flexible conduit connected at its ends to said float assemblies to provide flow therethrough of associated liquid into said flow passages of said float assemblies, whereby, when both of said float assemblies are at the same height, the liquid level in said housings will register with said indicator means thereof and, when they are at different heights, the liquid level may rise in the lower thereof until said float means seals said second valve seat opening to prevent flow of air and liquid therethrough.

2. The flexible level assembly of claim 1 wherein said housings of said flow assemblies include a transparent cylinder providing said chamber with the bottom end thereof being open to provide said flow passage thereinto.

3. The flexible level assembly of claim 2 wherein said indicator means comprises a ring element affixed to the exterior of said cylinder.

4. The flexible level assembly of claim 1 wherein said housing includes removable closure means at the upper end thereof, said closure means being substantially fluid and air tight when in place and removable during operation of said level assembly to permit flow of air through the upper end of said housing.

5. The flexible level assembly of claim 1 wherein at least one of said housings includes a second flow passage spaced above said first mentioned flow passage to permit introduction of fluid into said assembly, and removable closure means for said second flow passage.

6. The flexible level assembly of claim 1 wherein said housing includes a cylindrical member providing said chamber and wherein said valve seats are provided by generally annular members secured to the inner surface of said cylinder.

7. The flexible level assembly of claim 6 wherein said annular members include an annular lip depending from the lower surface thereof about said valve openings therein and providing the sealing surface of said valve seats.

8. The flexible level assembly of claim 7 wherein said valve members are cooperatively configured to providing an upstanding lip cooperating with said depending annular lip of said annular members.

9. The flexible level assembly of claim 7 wherein said valve members include a resiliently compressible upper surface portion cooperating with said depending annular lip of said valve seats to effect sealing engagement therewith.

10. The flexible level assembly of claim 1 wherein said float assembly includes float support means on said housing in said chamber below said second valve member to support said float thereon below said second valve member in the inoperative position thereof, said float support means being configured and dimensioned to permit passage of air and fluid by said support means and said float means when said float means is supported thereon.

11. The flexible level assembly of claim 1 wherein said actuating means is of generally conical configuration with weighting means disposed adjacent the apex thereof and apertures provided about the base thereof to permit flow of air and liquid thereby.

12. The flexible level assembly of claim 1 wherein a single actuating means is coupled to both said valve members by a generally axially extending connector providing said coupling means, whereby tipping over of said actuating means causes said connector to draw both said valve members upwardly against said valve seats.

13. The flexible level assembly of claim 1 wherein a separate valve member actuating means cooperates with each of said valve members and is disposed above each of said valve seats.

14. The flexible level assembly of claim 1 wherein a single valve member actuating means is provided above said second valve seat and is operatively connected to each of said valve members so as to effect concurrent movement of said valve members into sealing engagement with said valve seats.

* * * * *